United States Patent Office 3,231,464
Patented Jan. 25, 1966

3,231,464
FUNGICIDAL, COLOR-STABLE CUPRIC HYDROXIDE
Erich Dettwiler, Zurich, and Jean Filliettaz, Dielsdorf-Zurich, Switzerland, assignors to Rohm & Haas Company, Philadelphia, Pa., a corporation of Delaware
No Drawing. Filed Mar. 13, 1962, Ser. No. 179,479
Claims priority, application Switzerland, Mar. 18, 1961, 3,280/61
7 Claims. (Cl. 167—16)

This invention concerns a process for the preparation of a fungicidally effective, color-stable copper hydroxide and the copper hydroxide thus produced. The process comprises reacting (1) an aqueous solution containing cupric ions and also a water-soluble salt of a metal which forms a practically water-insoluble metal hydroxide and (2) an alkali metal hydroxide in an amount at least sufficient to form hydroxides from both said cupric ions and said metal salt, whereby a precipitate of hydroxides of both copper and said metal forms, separating said precipitate, and washing it with water until the pH reaches that of the wash water or is essentially free of alkali metal hydroxide.

As known, copper hydroxide of the general formula $Cu(OH)_2 \cdot xH_2O$ has been prepared by one of three methods: (1) treatment of a copper salt solution with hydroxyl ions, that is, precipitation with a solution of sodium or potassium hydroxide or of ammonia, (2) hydrolysis of a copper salt without addition of other chemicals and (3) formation by electrolysis.

The most important of the methods has been precipitation of a copper salt with bases such as solutions of sodium hydroxide, potassium hydroxide, or ammonia, or with strongly hydrolyzed alkaline salts, such as sodium carbonate or potassium cyanide.

The copper hydroxide obtained in this way is in the form of a gel which always retains ions of the precipitating agent, especially potassium and sodium ions, and also negative ions from the copper salt. It is almost impossible to free the copper hydroxide thus prepared from these absorbed constituents so that a pure, color-stable copper hydroxide cannot be obtained by the known methods.

Copper hydroxide as prepared by methods of the art is initially light blue, but it slowly turns black in air or in water even at ordinary temperatures and does so more rapidly with increased temperatures. These changes are due to transformation of the copper hydroxide into copper oxide.

It is also known that a somewhat more stable copper hydroxide is formed when freshly precipitated copper hydroxide is thoroughly washed and then treated with alkalies. Pure copper hydroxide without alkali is not stable.

Copper compounds, such as copper sulfate, copper oxychloride and copper carbonate, are used in the field of phytopathology for combating parasitic fungi.

A disadvantage of copper hydroxide prepared by the previously known methods results from the fact that it is transformed because of its instability in a known way into black copper oxide, resulting in a total loss of fungicidal effectiveness. Another disadvantage of copper hydroxides prepared by previous methods lies, among other things, in that plants sprayed therewith are damaged. It has become evident that cupric hydroxides produced up to now show shortcomings and instability too great to permit their successful use in the field of phytopathology.

It has now been proved surprisingly and quite unexpectedly that a fungicidally effective and color-stable copper hydroxide can be obtained by precipitation with an alkali from a cupric salt solution containing also a salt of a metal giving a water-insoluble metal hydroxide such as a magnesium salt or a mixture of magnesium and zinc salts, the proportion thereof being sufficient to provide color stability. Thus, for example, copper hydroxide may be precipitated with an alkaline medium from a solution containing a cupric salt together with preferably a magnesium salt to give a color-stable, light-blue coprecipitate containing both copper hydroxide and practically water-insoluble magnesium hydroxide or magnesium and zinc hydroxides.

Among the advantages of a copper hydroxide prepared according to the process of this invention are its stability of color and its strongly fungicidal property. After plants have been sprayed, therewith, there may readily be ascertained at any time to what surfaces the spray has been applied, whereas in the case of unstable copper hydroxides, sprayed parts cannot be recognized because the blue color disappears. Also, when magnesium is present in the precipitated product, the copper hydroxide of this invention is effective against leaf disease caused by magnesium deficiency, a condition of extreme importance in the treatment of grapevines, since such disease may cause premature defoliation, which severely affects the ripening process of grapes.

A typical preparation of copper hydroxide of this invention is presented in the following illustrative example.

A solution of ¼ gram mole of $CuCl_2 \cdot 2H_2O$ and ¹⁄₃₂ mole of $MgSO_4 \cdot 7H_2O$ is made in one liter of water. Thereto is added in small portions a solution of 28 grams of sodium hydroxide in 250 ml. of water. During the resulting precipitation, thorough stirring is necessary to avoid the formation of lumps and strongly alkaline zones. The thoroughly agitated precipitate shows a pH of about 12.75. The precipitate is in the form of a hydrogel. It is filtered off and washed with water until the pH of the wash water is reached. The washed precipitate is then dried at about 100° C.

At this temperature the product is completely stable in contrast to the ordinary copper hydroxide. There is a further advantage in that excess alkali may be used without danger of the hydroxide turning black from formation of copper oxide.

In place of the above copper salt there may be used other soluble salts which include sulfate, acetate, and nitrate, and other alkali hydroxides than sodium hydroxide, as has been indicated above. Other soluble magnesium salts in wide proportions may likewise be used and, as well, mixtures of a soluble magnesium salt and a soluble salt of another metal, such as zinc.

We claim:
1. A process for preparing a color-stable fungicidal product which comprises reacting by mixing (1) an aqueous solution containing a water-soluble cupric salt and a water-soluble salt of magnesium wherein the mole ratio of said cupric salt to said magnesium salt is about 8 to 1 and (2) a molar excess of alkali metal hydroxide wherein the mole ratio is at least 22.4 to 1 with respect to said magnesium salt reactant, whereby a precipitate of both copper and magnesium hydroxides forms, separating said precipitate, and washing it with water.

2. A process for preparing a color-stable fungicidal product which comprises adding to an aqueous solution containing a cupric salt and a magnesium salt, wherein the mole ratio of said cupric salt to said magnesium salt is about 8:1, a molar excess of an aqueous solution of an alkali metal hydroxide in mole ratio of at least 22.4 to 1 with respect to said magnesium salt in repeated increments with good agitation, whereby a precipitate of both cupric and magnesium hydroxides forms, separating said precipitate, washing it with water until the pH reaches that of the wash water, and drying the washed precipitate.

3. A process for preparing a color-stable fungicidal product which comprises reacting by mixing (1) an aqueous solution of a water-soluble cupric salt, a zinc salt and a magnesium salt wherein the mole ratio of said cupric salt to combined said zinc and magnesium salts is about 8 to 1 and (2) a molar excess of an aqueous solution of sodium hydroxide wherein the mole ratio of said sodium hydroxide with respect to said combination of magnesium and zinc salt reactants is at least 22.4 to 1, whereby a precipitate of co-precipitated cupric, magnesium and zinc hydroxides forms, separating said precipitate, washing it with water, and drying the washed precipitate.

4. The color stable fungicidal product produced by the process of claim 1.

5. The color stable fungicidal product produced by the process of claim 3.

6. The method of protecting plants against fungi comprising spraying the plants with a fungicidally effective amount of the product of claim 4.

7. The method of protecting plants against fungi comprising spraying the plants with a fungicidally effective amount of the product of claim 5.

References Cited by the Examiner

UNITED STATES PATENTS

| | | | |
|---|---|---|---|
| Re. 24,324 | 5/1957 | Furness | 23—147 |
| 1,598,982 | 9/1926 | Newhall | 167—16 |
| 1,832,569 | 11/1931 | Mayor | 252—475 |
| 1,867,357 | 7/1932 | Furness | 23—147 |
| 1,905,532 | 4/1933 | Vannah | 167—16 |
| 1,908,696 | 5/1933 | Dodge | 252—475 |
| 2,325,207 | 7/1943 | Stengel et al. | 252—475 |
| 2,524,566 | 10/1950 | Houtman et al. | 252—475 |
| 2,576,731 | 11/1951 | Thomsen | 167—16 |
| 2,581,951 | 1/1952 | Harshaw et al. | 167—16 |
| 3,127,241 | 3/1964 | Periard et al. | 23—201 |

FOREIGN PATENTS

| | | |
|---|---|---|
| 557,951 | 5/1958 | Canada. |
| 455,594 | 5/1913 | France. |

OTHER REFERENCES

Holmes et al.: J. American Chemical Soc., vol. 63, November 1941, pp. 2911–15.

JULIAN S. LEVITT, *Primary Examiner.*

LEWIS GOTTS, *Examiner.*